United States Patent
Otten et al.

[11] Patent Number: 5,139,044
[45] Date of Patent: Aug. 18, 1992

[54] FLUID CONTROL SYSTEM

[76] Inventors: Bernard J. Otten, 18161 Buena Vista Ave., Yorba Linda, Calif. 92666; Gary W. Warth, 4439 Sunflower Ave., Covina, Calif. 91724

[21] Appl. No.: 745,478

[22] Filed: Aug. 15, 1991

[51] Int. Cl.$^5$ ............................................. F16K 17/38
[52] U.S. Cl. ......................................... 137/80; 137/62; 137/78.2; 239/68; 239/69
[58] Field of Search ............... 137/78.2, 78.3, 62, 137/79, 80; 239/68, 69, 70

[56] References Cited

U.S. PATENT DOCUMENTS

| | | | |
|---|---|---|---|
| 3,712,327 | 1/1973 | Pagenkopf | 137/78.2 |
| 3,812,872 | 5/1974 | Block et al. | 137/62 |
| 4,209,131 | 6/1980 | Barash et al. | 239/69 |
| 4,545,396 | 10/1985 | Miller et al. | 239/69 |
| 4,635,668 | 1/1987 | Netter | 137/61 |
| 4,921,001 | 5/1990 | Pittsinger | 239/70 |

*Primary Examiner*—A. Michael Chambers
*Attorney, Agent, or Firm*—Harness, Dickey & Pierce

[57] ABSTRACT

The fluid control device of the present invention combines a flow sensing unit in series with a control valve. The flow sensing unit is of the displacement piston type and the flow rate is electronically sensed. A single action poppet valve assembly facilitates the use of a self contained power supply for use in remote locations. A microprocessor monitors parameters including pressure, flow rate, temperature and flow volume, and is enable to activate the control valve to the open or shut positions based upon any combination of the monitored parameters.

31 Claims, 7 Drawing Sheets

FLUID CONTROL SYSTEM

BACKGROUND OF THE INVENTION

Unintentional loss of fluid control often results in many undesirable, expensive and dangerous conditions. Constant monitoring of devices requiring use of or providing application of fluids has in the past been costly, inconvenient or virtually impossible. Conduit ruptures, mechanical accidents, system failures, leaks or carelessness are only a few hazards contributing to this overall problem. These and other hazards are further discussed in Disclosure Document No. 248719 received by the Patent and Trademark Office Apr. 5, 1990.

By way of example, a freeze ruptured water pipe in a residence can result not only in an expensive utility bill, but also extensive water damage to the structure and landscaping. Leaky toilets contribute significantly to the overall waste of water resources. Accidentally broken sprinkler fixtures present domestic and public flooding problems as well as driving hazards along highways. Gas line ruptures resulting from natural catastrophes increase the likelihood of fire and explosion.

Each new circumstance presents a different control problem. A broken sprinkler fixture is often obvious, whereas a leaking subterranean supply line often is not. A running hose may be intentional, whereas a freeze ruptured water line is not.

Known flow monitoring systems include those systems which are attached to the main water distribution system and are set to shut off on the occurrence of an abnormally high flow condition, such as a system rupture. In large facilities such as chemical plants, flow rate control and timing may be performed with exactitude, but the size and cost of the equipment and the power required to effect the control makes such a system unworkable in smaller applications.

This is especially true in the case of remotely located points such as a water tap in a rural location such as for watering livestock, or a water tap located outside of a building, but away from the power necessary to actuate the flow of water.

SUMMARY OF THE INVENTION

The present invention addresses these fluid control issues. Different potential problems can be solved simultaneously with one device, and include, but are not limited to the detection of parameters such as: small leaks, excess volume, excess rate, too high or too low fluid temperature, too high or too low ambient temperature, and too high or too low pressure. All of these parameters can be detected and monitored based on the desires of the operator. In response to the existence of one or more of these parameters, the flow may be shut off, an alarm sounded, or other devices actuated. This invention can monitor a single device or several devices sharing the same source of flow. Its control center may be integrated into a local housing or remotely located. Alarm systems may be mounted directly to the device or actuated by electrical, fiber optic, or radio/telephonic means, alerting an individual or an off-site control center.

The present invention is directed toward a fluid control system. The system includes a valve for moving between the open and closed positions, and a valve actuator for manually setting the valve to the open or closed position and triggerably actuating the valve to the closed or open position, respectively. The system also includes sensors to monitor physical parameters, and a microprocessor, coupled to the sensors and valve actuator, for processing the sensor data and triggering the valve actuator. In one possible embodiment, the sensors are flow rate sensors in series with the valve, for producing data indicative of the flow through the valve.

The valve actuator is manually operated to set the valve in its normal position. The normal position can be either open or closed, as required by the application. When the valve's normal position is open, the microprocessor can trigger the valve actuator to close the valve. Conversely, when the valve's normal position is closed, the microprocessor can trigger the valve actuator to open the valve.

All flow related, valve control and alarm functions of the fluid control system of this invention have the ability to be programmed into the device by the operator and may be readily overridden, if so desired, for manual operation at a particular installation. The four basic measured parameters are: temperature, pressure, volume, and flow rate. Each may function independently, or in unison. Basic operation begins when the operator enters the desired functions and their values. For example, if the sole responsibility of one device is to prevent water damage due to a freeze ruptured pipe, only the temperature function need be activated. At any time when the temperature drops below freezing for a pre-set period, the device may be programmed to go into an alarm state, thereby alerting the operator and/or actuating the supply valve. If the volume is to be monitored, for example, the operator may enter the maximum acceptable volume into the control panel of the fluid control system. If the entered volume is exceeded, the device may be programmed to alert the operator and/or actuate the supply valve. If the flow rate is to be monitored, the maximum desired flow rate is entered through the control panel of the fluid control system. Should this entered flow rate be exceeded, the device may be programmed to alert the operator and/or close the supply line. If pressure is to be monitored, for example, the operator may enter a minimum or maximum pressure such that if the pressure drops below or exceeds the pre-set limits, the device may be programmed to alert the operator and/or close or open the supply line. Additionally, one, two, three or all four basic functions may be programmed in to monitor a device at the same time. As an example, a highway sprinkler system could be programmed to use all three functions. Should there be a danger of the temperature dropping too low, presenting a freeze danger, this parameter would be programmed to be monitored by the device. At the same time, if this sprinkler system is known to use only a certain volume of water during each cycle, the volume per cycle can also be programmed to be monitored. The fluid control device may be further programmed such that should a control valve to the sprinkler system fail to close, the fluid control device will take over, closing the valve and alert the operator. Also, if the maximum flow rate of water for this system is entered, that parameter can also be monitored and the fluid control device programmed to act based upon the flow parameter. For example, should a sprinkler head be broken off causing unrestricted flow, the fluid control device would sense it and, depending on its programming, could close the valve and/or alert the operator.

In addition to the added safety provided by monitoring fluid flow, the fluid control device of the present invention allows for parameter inputs from outside sources. As an example, in the case of a natural gas fire and explosion, the fluid control device may be placed in the gas line supplying fuel for a factory, business, home, or piece of equipment. In the event of an earthquake, a local utility company may selectively or collectively shut off any potentially damaged gas lines configured with this device by broadcasting a shutoff signal by radio control or over local alternating current lines. The fluid control device, when receiving the correct signal would shut the valve, thereby preventing unnecessary fire and/or explosion hazards. At the level of the single end user such as a home, the fluid control device could be programmed to shut the gas lines upon the occurrence of an excessive flow condition such as would be created in the event of a gas pipe rupture.

BRIEF DESCRIPTION OF THE DRAWINGS

FIG. 8b is a side sectional view of the second embodiment illustrated in FIG. 8a;

FIG. 9b is a side sectional view of the third embodiment illustrated in FIG. 9a;

DETAILED DESCRIPTION OF THE PREFERRED EMBODIMENT

The following description of the preferred device is only used by way of example. Alternate designs will become readily apparent after examination of the detailed description hereinafter, and are covered by this patent.

Figure 1:
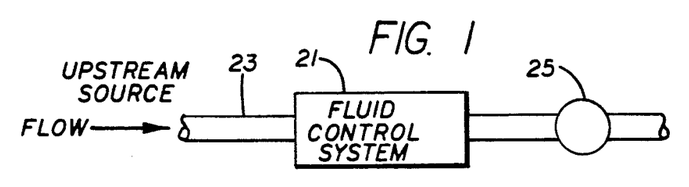
FIG. 1 is a schematic representation of the fluid control system of the present invention illustrated upstream of the flow appliance whose flow is to be controlled.

Referring to FIG. 1, a block diagram representation of the fluid control system of the present invention, indicated generally by the reference numeral 21 is situated along a flow conduit 23. The appliance whose flow is to be monitored is indicated generally by the reference numeral 25, and is located downstream of fluid control system 21, as is indicated in reference to the relative position of fluid control system 21 and appliance 25 to the flow arrow 10.

Figures 2, 3, 6, 7, 13:
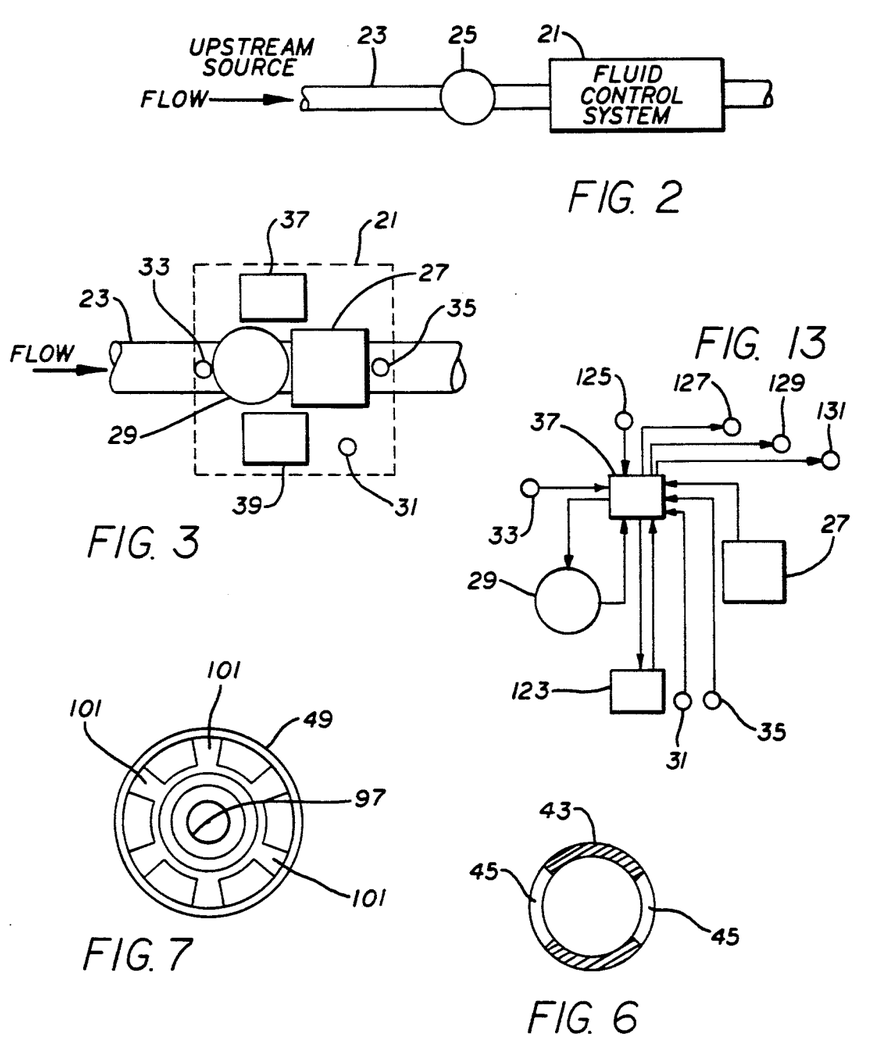
FIG. 2 is a schematic representation of the fluid control system of the present invention illustrated downstream of the flow appliance whose flow is to be controlled.
FIG. 3 is a schematic representation of the fluid control system of the present invention illustrating the sensor locations and control valve placement within a self-contained flow sensing unit.
FIG. 6 is a cross sectional detail taken along line 6—6 of FIG. 5.
FIG. 7 is a cross sectional detail taken along line 7—7 of FIG. 5.
FIG. 13 is a schematic block diagram of the interrelationships between the basic components of the fluid control device of the present invention.

Appliance 25 may be, in the event that flow conduit 23 is a water line, a sprinkler system, irrigation system, water rationing system, a water dispensing system, a flushing system or the like. Appliance 25 may be a liquid or gas product metering system for use at the point of sale. Referring to FIG. 2, the appliance 25 whose flow is to be monitored is located upstream of fluid control system 21, as is indicated in reference to the relative position of fluid control system 21 and appliance 25 to the flow arrow.

Referring to FIG. 3, a schematic representation of the fluid control system of the present invention illustrates the possible location of various sensors within the fluid control system 21 boundary indicated by the rectangular dashed line. Fluid control system 21 is shown schematically about the flow conduit 23, but in the preferred embodiment, the fluid control system actually forms a portion of the flow conduit 23.

Within the boundary of fluid control system 21 there may be collocated a series of components for sensing physical conditions pertinent to the fluid control system 21 of the present invention, including a flow sensing unit 27, a control valve 29, an ambient temperature sensor 31, a pressure sensor 33, a fluid temperature sensor 35, as well as a microprocessor 37, including its support circuits, to which the sensing components are connected. A control panel 39 is also connected to microprocessor 37 to facilitate the inputting of control information. Microprocessor 37 utilizes the control information to establish command parameters and to read information with which to compare the physical parameter information received by the components for sensing physical parameters, outlined above. Microprocessor 37 is enabled to act, depending upon the instructions of its programming, to trigger the control valve 29 and/or perform other functions. Virtually any of these physical condition parameters or information sensing components may be located remotely with respect to the boundaries of fluid control system 21 as necessity or convenience may necessitate, but it is believed that the maximum utility and convenience may be derived in the mounting of all of the components in a single housing (FIGS. 4a, 11 and Referring to FIG. 4a and FIG. 5, a sectional view of the flow sensing unit 27 and the control valve 29 of the flow control system of the present invention is shown. A flow sensing unit housing 40 is connected to two threaded male unions 24. A displacement piston 41 is positioned in flow chamber 42 within a flow cylinder 43 within flow sensing unit housing 40. The middle portion of displacement piston 41 is fitted with a cylindrically shaped magnet 44. In the preferred embodiment, the magnet 44 is ferromagnetic. A cross section of flow cylinder 43 is best seen with respect to FIG. 6. Flow cylinder 43 slidably supports displacement piston 41. Flow cylinder 43 contains a pair of bilateral triangularly shaped apertures 45 through which the flowing fluid passes. The flow rate is proportional to the axial displacement of displacement piston 41, which in turn provides a differentially larger exposure of aperture 45 to fluid flow 10. A spring 47 is in position to urge displacement piston 41 in one direction while urging against a plug 49. Spring 47 is connected to displacement piston 41 within annular cavity 55. End cap 51 seals the rear end of flow cylinder 43 and adjustably supports adjustment screw 53. Plug 49 is fixedly attached to adjustment screw 53. The position of plug 49 is adjusted using adjustment screw 53.

Other flow chamber designs can be used that permit the flow rate through the flow chamber to increase proportionally as the piston is axially displaced. For example, the flow cylinder can have a tapered bore adapted to axially movably receive a compatible tapered piston. The passage or space between the tapered bore and tapered piston increases as the piston is axially moved away from the small end of the bore.

Displacement piston 41 forms one part of what may be referred to as a piston displacement type flow rate indicator. The operation of displacement piston 41 is similar to a class of flow indicating elements which are generally displaceable, under conditions of flow, against a constant force, such as the force of gravity or a proportional force, such as the force produced by spring 47. A circular radially inwardly disposed land 57 opposes the linear extent of travel of displacement piston 41 in the direction urged by spring 47. Land 57 has a beveled portion 59 angled to match a beveled portion 61 of displacement piston 41. Beyond the beveled portion 59 of land 57, a smooth bore 63 forms the concentrically smallest point of the fluid flowpath 10.

The operation of this spring opposed, piston displacement type flow sensing unit 27 is based upon the principle that a flowing fluid produces a force against an object in its flow path which is proportional to the flow of the fluid. Here, the increasing force on the displacement piston translates into increasing force on spring 47. The force exerted upon a spring produces a displacement of the spring. Therefore, the displacement of the displacement piston 41 is proportional to the force applied to the spring and to the flow.

Figure 4A:
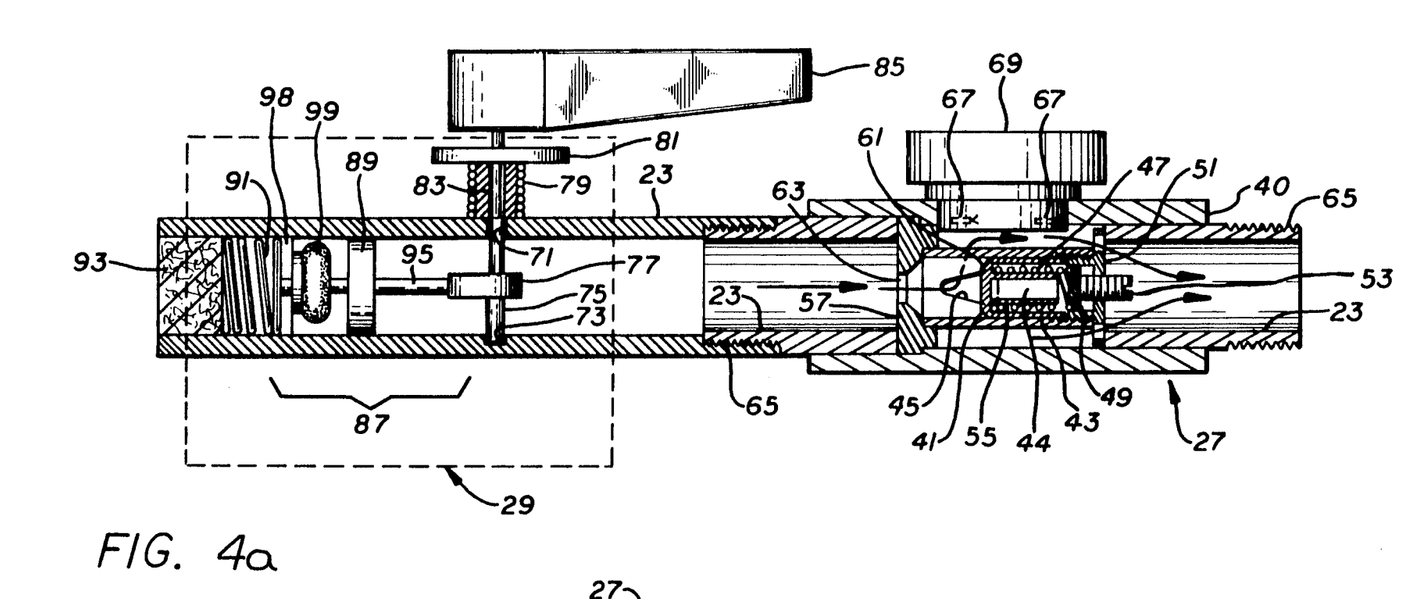
FIG. 4a is a sectional view of the control valve and flow sensing unit of the fluid control system of the present invention.
Figure 4B:
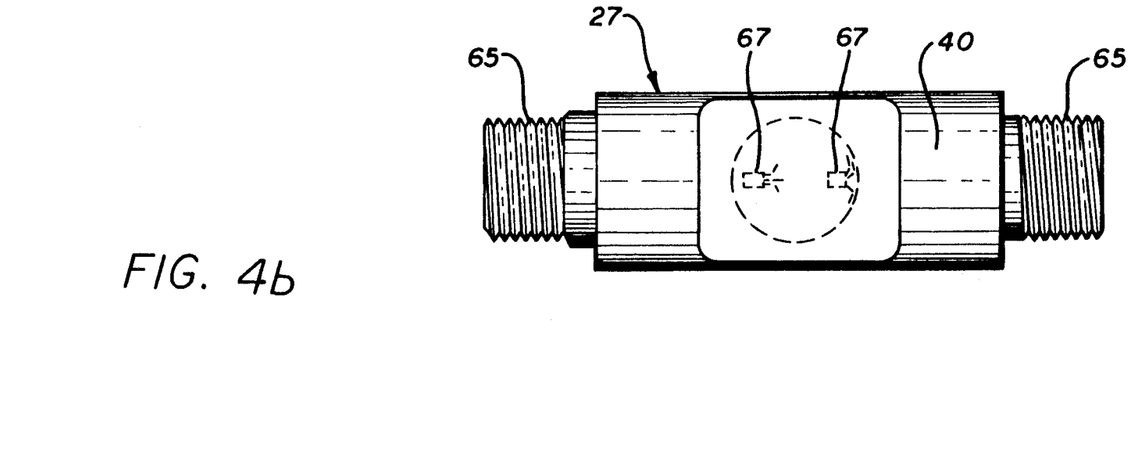
FIG. 4b is a top view of the sensing unit of FIG. 4a illustrating the placement of Hall effect sensors in dashed line format.

Referring to FIG. 4b, a top view of the flow sensing portion of the fluid control system of the present invention is illustrated. Referring to both FIGS. 4a and 4b, the incorporation of the flow sensing unit 27 of the present invention into a separate unit will maximize the degree to which the flow control system of the present invention can be assembled, repaired and interchanged for differing specifications with greater ease. The flow sensing unit 27 of FIG. 4b has a pair of threaded ends 65 to facilitate attachment thereof. The embodiment of FIGS. 4a and 4b utilize the Hall effect to detect the position of displacement piston 41. The detailed workings of the Hall effect will be explained later. In FIGS. 4a and 4b a pair of Hall effect sensors 67 are located within a flow sensing unit 27 adjacent the location of displacement piston 41. A service cap 69 provides easy service access to the Hall effect sensors 67 when necessary for maintenance, calibration, etc.

Figure 5:
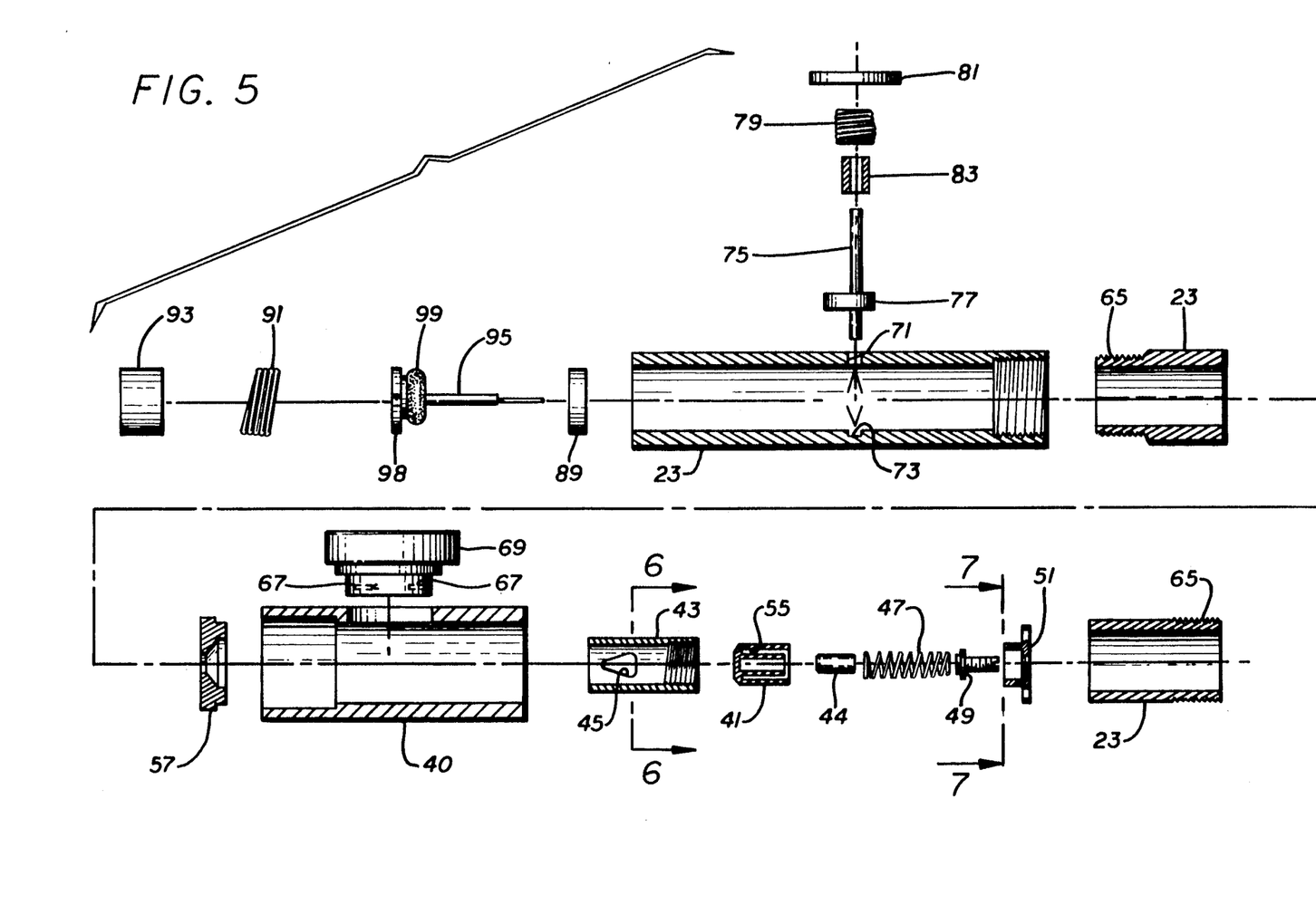
FIG. 5 is an exploded sectional view of the valve and flow sensing unit of the fluid control system of the present invention.

Referring to the left side of FIG. 4a and to the exploded view of FIG. 5, the control valve 29 and its component parts are illustrated. In the control valve 29 portion of flow conduit 23, a bore 71 having an axis perpendicular to the axis of flow conduit 23 is located at the upper side of flow conduit 23 and extends completely therethrough. A blind bore, or shaft dimple, 73 is located at the bottom interior portion of flow conduit 23 and extends into the inner surface of flow conduit 23 just far enough to form a lower journal, along with the upper journal provided by bore 71, for a rotatable shaft 75.

Along the portion of rotatable shaft 75 located at the center of flow conduit 23 is attached a cam disk 77. Rotatable shaft 75 extends through cam disk 77 at a point offset from the radial center of cam disk 77. At the upper portion of rotatable shaft 75, a torque spring 79 surrounds rotatable shaft 75 and extends from the exterior portion of flow conduit 23 to an anchoring disk 81 fixedly mounted to the rotatable shaft 75. A retainer nut 83 holds rotatable shaft 75 in place within flow conduit 23, threadably turnable onto a boss 84 portion of the exterior of flow conduit 23. A valve handle 85 is mounted atop rotatable shaft 75. The valve handle 85 is utilizable to urge movement of rotatable shaft 75 in a direction against the rotatable urging of torque spring 79. As will be shown, anchoring disk 81 is utilizable to limit the range of movement of rotatable shaft 75, and to set rotatable shaft 75 in a particular orientation for triggering.

Control valve 29 consists of poppet valve assembly 87, valve seat 89, valve spring 91, retainer 93 and poppet valve shaft 95. Poppet valve assembly 87 is opened and controlled by poppet valve shaft 95.

Valve seat 89 provides a face surface generally perpendicular to the axis of flow conduit 23. Referring to FIG. 7, a cross section of the valve seat 89 is illustrated with respect to line 7—7 of FIG. 5. At the center of valve seat 89 is a journal 97 for axially slidable support of the poppet valve shaft 95. The valve seat has a plurality of flow passages 101 to permit fluid flow to pass through valve seat 89. Liquid flow can proceed through the valve seat 89, so long as the face 102 and passages 101 of valve seat 89 are not covered by "O"-ring 99 of the poppet valve assembly. A guide disk 98 is attached at the opposite end of poppet valve shaft 95 and, along with journal 97 in valve seat 89, serves to keep poppet valve shaft 95 aligned against cam disk 77.

Rotation of rotatable shaft 75 is used to linearly move poppet valve shaft 95 by cam action, and thereby control poppet valve assembly 87. To open poppet valve assembly 87, rotatable shaft 75 is turned so that cam disk 77 pushes poppet valve 95, and thereby "O"-ring 99, away from valve seat 89. This action uncovers the face of valve seat 89 and allows fluid flow as described above.

Referring to FIG. 5, the phantom poppet guide disk, "O"-ring, and poppet valve shaft illustrate their interaction with valve seat 89 when rotatable shaft 75 is turned to close poppet valve assembly 87. Valve spring 91 urges the poppet guide disk and "O"-ring against valve seat 89 to cover the face of valve seat 89 and prevent fluid flow. Although a poppet valve assembly is shown, other types of valve assemblies may be used, such as butterfly valves, gate valves, ball valves and the like.

In the fluid control system of the present invention, three methods are used for signaling recognition of the linear displacement of displacement piston 41, corresponding to three embodiments, including the use of the Hall effect, the use of magnetically actuatable reed switches, and the use of a tuning coil.

Referring to FIGS. 4a-7, several views of the valve and flow sensing unit of the fluid control system of the present invention were illustrated. Flow sensing unit 27, represented in dashed line format, included an area for attachment to a control valve 29. In those views of the invention, the flow sensing unit 27 was illustrated with Hall effect sensors 67. These devices assist in sensing the axial position of displacement piston 41 and thus enable flow detection.

Although the principles of the Hall effect transducers 67 are well known, and not specifically the subject of the invention herein, the Hall effect sensors 67 are responsive to the position of the magnet 44 within displacement piston 41, to thereby produce an output signal indicative of the fluid flow in flow conduit 23. Current flow in a conductor which is under the influence of a magnetic field does not flow evenly through the conductor. The degree of uneven distribution of current flow is proportional to the strength of the magnetic field. In the first embodiment of the invention, a magnetic field from the magnet 44 affects the pair of Hall effect sensors 67 in relation to the axial position of displacement piston 41. Hall effect sensors 67 include a plurality of leads, as is indicated with reference to FIGS. 4 and 5, for accepting a supply of current to the Hall effect sensors 67 and the outputting of a signal, which, by virtue of the principles previously discussed, will be indicative of fluid flow within flow conduit 23.

Figure 8A:
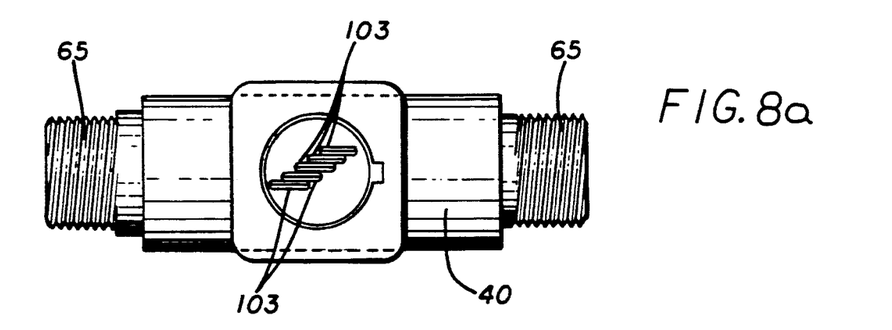
FIG. 8a is a top view of a second embodiment of the flow sensor utilized in the present invention illustrating the location of a series of reed switches.
Figure 8B:
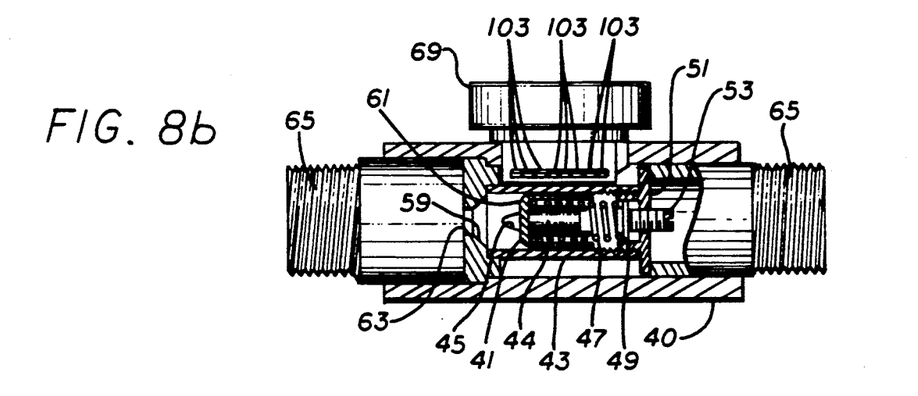

Referring to FIGS. 8a and 8b, a second embodiment employing the use of a series of magnetically actuatable reed switches 103 is illustrated in top and side view, respectively. The use of magnetically actuatable reed switches 103 also requires that the displacement piston either be made of magnetized ferromagnetic material or have magnet 44 mounted therein. The reed switches 103 are located adjacent the flow piston 41 and similarly protected by the service cap 69. Each reed switch 103 closes its contacts when it sufficiently comes close enough to flow piston 41 to come under the influence of the magnetic field generated by the magnet 44.

The logic schemes available to determine the location of displacement piston 41 can include the sequential closure of only the reed switch 103 in the vicinity of the strongest point of the magnetic field, or the sequential closure of a line of switches up to the point where a threshold magnetic potential is present, near some defined point on displacement piston 41. A series of resistors, possibly of different values, may be used in conjunction with the reed switches 103 to give a total resistance signal as an indication of the position of displacement piston 41.

Figure 9A:
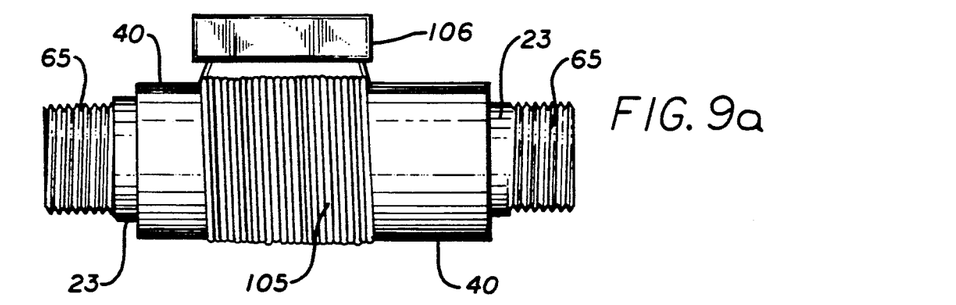
FIG. 9a is a side view of a third embodiment of the flow sensor utilized in the present invention illustrating the location and use of a sensing coil.
Figure 9B:
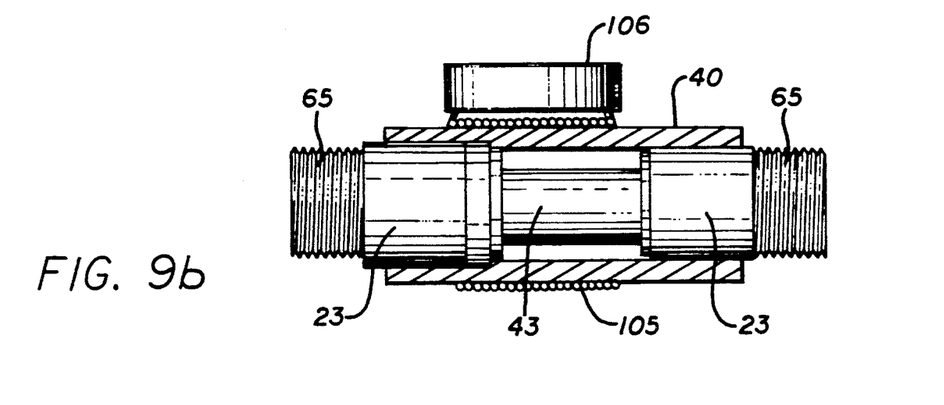

Referring to FIG. 9a and 9b, a third embodiment of the fluid control system of the present invention utilizing a tuning coil 105 is illustrated in side and side sectional view, respectively. Tuning coil 105 consists of a conductor wrapped about the outside of flow sensing unit housing 40. Flow cylinder 43 contains piston 41, magnet 44, spring 47 and plug 49 as shown in FIG. 8b. The flow cylinder has apertures 45, and is connected to land 57 and end cap 51. In FIG. 9b the flow cylinder 43 is shown in plan view in unit housing 40 between two threaded male unions 24. Note the somewhat offset position of the tuning coil 105 with respect to flow sensing unit 27. An axially offset position of tuning coil 105 offers a more significant change in inductance per unit displacement of displacement piston 41. As the displacement piston 41 moves into and out of the tuning coil 105, the inductance of tuning coil 105 changes. The inductance of tuning coil 105 at any given time may be tested with known circuitry. The inductance of tuning coil 105 is therefore proportional to the displacement of displacement piston 41, which is, in turn, proportional to the flow of fluid through flow sensing unit 27. An electronics unit 106 sits adjacent and somewhat away from coil 105. Electronics unit 106 may be used to house the circuitry necessary to energize coil 105, as well as the circuitry necessary to measure changes in the inductance of coil 105. Since inductance represents a barrier to alternating current low, circuitry locatable in electronics unit 106 would probably perform both functions. In FIG. 9b the flow cylinder 43 is shown in plan view in unit housing 40 between two threaded male unions 24.

Figure 10A:
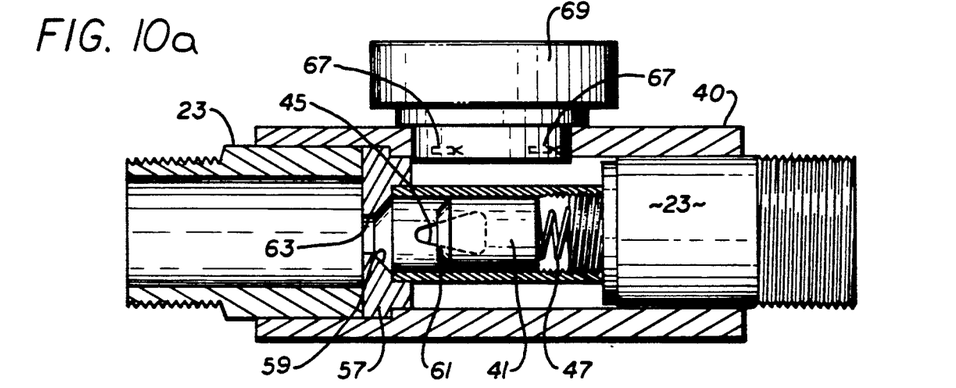
FIG. 10a is a side sectional view of the flow meter portion of the first embodiment of the present invention in the flowing condition.
Figure 10B:
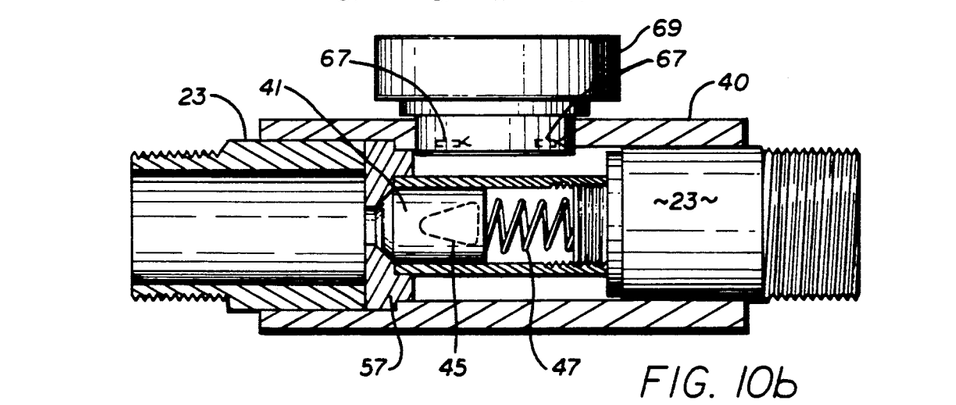
FIG. 10b is a side sectional view of the flow meter portion of the first embodiment of the present invention in the non-flowing condition.

Referring to FIGS. 10a and 10b, a sectional view of the operation of the fluid control system of the present invention is illustrated. The components in the FIGS. 10a and 10b are the same as those shown in FIGS. 4a-7. FIG. 10a illustrates the displacement of displacement piston 41 in response to fluid flow. As displacement piston 41 is displaced in the downstream direction to enable the flowing fluid to pass through apertures 45, spring 47 is compressed. When no fluid flow occurs, the displacement piston 41 is urged completely in the upstream direction until the beveled portion 59 of land 57 contacts the beveled portion 61 of displacement piston 41.

Figures 11, 12:
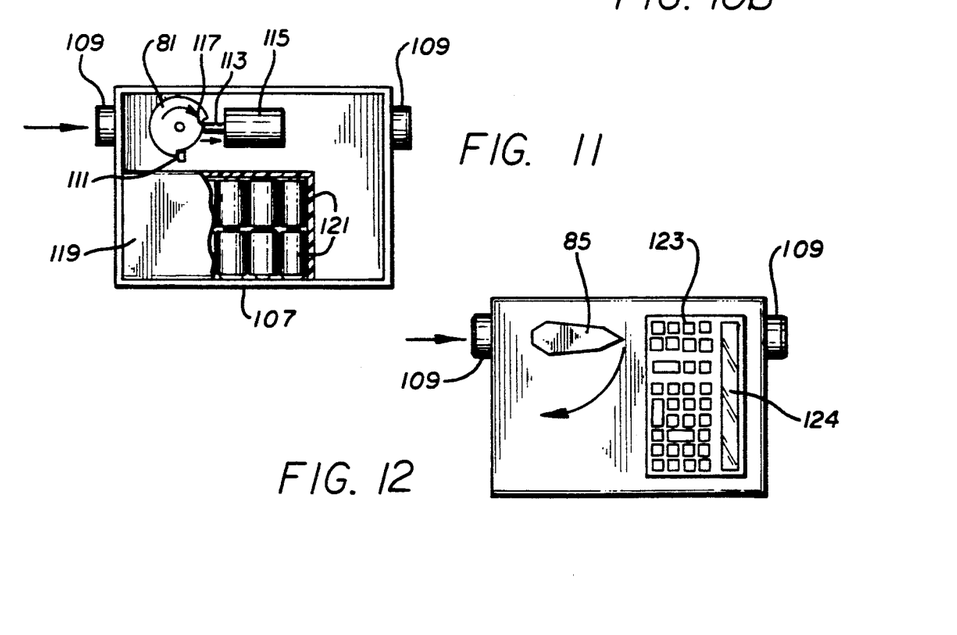
FIG. 11 is a plan view of the fluid control system of the present invention mounted in a housing.
FIG. 12 is a plan view of the exterior of the housing of the fluid control system of FIG. 11.

Referring to FIG. 11, a plan view of the fluid control system 21 of the present invention mounted in a housing 107 is illustrated. At the left and right sides of housing 107, a pair of connectors 109, such as those used in conjunction with an ordinary water hose, facilitates the connection of the fluid control system 21 and housing 107 to a standard water supply device such as a threaded water tap.

In FIG. 11, the rotatable shaft 75 and anchoring disk 81 are visible. One fourth, or 90° of the circumference of anchoring disk 81 has a reduced radius. Adjacent the reduced radius, a bump stop 111 determines the radius of turn of anchoring disk 81 and therefore shaft 75. Here, it is readily seen that the angle of turn available to rotatable shaft 75 is about 90°. This angle of turn is sufficient to move valve assembly 87 of FIGS. 4a and 5 from the fully open to fully shut position. Typically, the fluid control system 21 of the present invention will be "cocked" to the open position and "tripped" to the closed position, but the fluid control system may be configured to be "cocked" to the closed position and "tripped" to the open position, particularly when time, temperature, static pressure or any other non-flow based quantity is utilized as a set point.

The system can be used to trip or signal a variety of other devices. For example, if the valve is closed on a cooling line to a condenser, the system can be used to shut off the heat source of a distillation unit and the feed pumps.

Adjacent anchoring disk 81, a solenoid plunger 113, slidably housed within a solenoid coil 115, engages the edge 117 or transition boundary between the quarter turn of lesser radius and the outermost radius of the anchoring disk 81. Solenoid plunger 113 is springingly urged outwardly toward anchoring disk 81 via a spring (not shown), and drawable into the coil 115 upon the application of a current to the solenoid coil 115 as is well known. With regard to the embodiment of FIG. 11, the anchoring disk 81 is in cocked position, and torque spring 79 is urging shaft 75 and anchoring disk 81 in a clockwise direction, its movement prevented by the engagement of solenoid plunger 113 with edge 117. Upon triggering, the solenoid plunger 113 disengages edge 117, and rotatable shaft 75 is urged one quarter turn by torque spring 79. Poppet valve assembly 87 then assumes a closed position or an open position, depending on whether the poppet valve assembly 87 was initially set open or closed positions, respectively. A battery housing space 119 is provided for insertion of batteries 121 for enabling the fluid control system 21 to become an electrically self contained unit. Batteries within battery housing space 119 operate both the microprocessor 37 (not visible in FIG. 11) and the solenoid coil 115.

Referring to FIG. 12, in the completed and fully assembled fluid control system, the valve handle 85, to facilitate manual actuation, is exposed to the exterior of the unit to facilitate easy cocking or setting of the control valve 29 of the flow control system 21. In addition, an externally exposed input keypad 123 is provided to facilitate manually adjustable programming of the instructions for flow control by an operator. Keypad 123 may have any combination of numerical and designated function key inputs. Keypad 123 has a keypad display 124 to yield a visual display for use in conjunction with microprocessor 37. The keypad display 124 facilitates programming of microprocessor 37 by providing a visual display of the programmed configuration for checking the user selected operational parameters and to assist in the orderly programming of microprocessor 37 by providing prompts to the user to enable orderly, accurate and easy programming. The keypad can be remotely connected to the system.

Referring to FIG. 13, a block schematic of fluid control system 21, in addition to the previously mentioned components, has a set of I/O, or input-output ports 125 which can be connected to other valve controls such as a remote sensor, an audio alarm output port 127, visual alarm output port 129, and option port 131 all communicating with microprocessor 37. I/O port 125 would typically be utilized to communicate data, and/or instructions, to another location, either real-time as it occurs, or in a batch manner to collect the flow profile data.

Other structures which are also pictured in FIG. 13 include the previously discussed control valve 29 which has both an input and an output connection with microprocessor 37. The flow sensing unit 27 ambient temperature sensor 31, pressure sensor 33, fluid temperature sensor 35 are the same as was illustrated in FIG. 3. Both the control valve 29 and keypad 123 have, and are shown as having both an input from and an output into microprocessor 37. Therefore, microprocessor 37 can both control and sense the position of control valve 29.

Microprocessor 37 can receive inputs from keypad 123 and display information to the keypad display 124.

Figure 14:
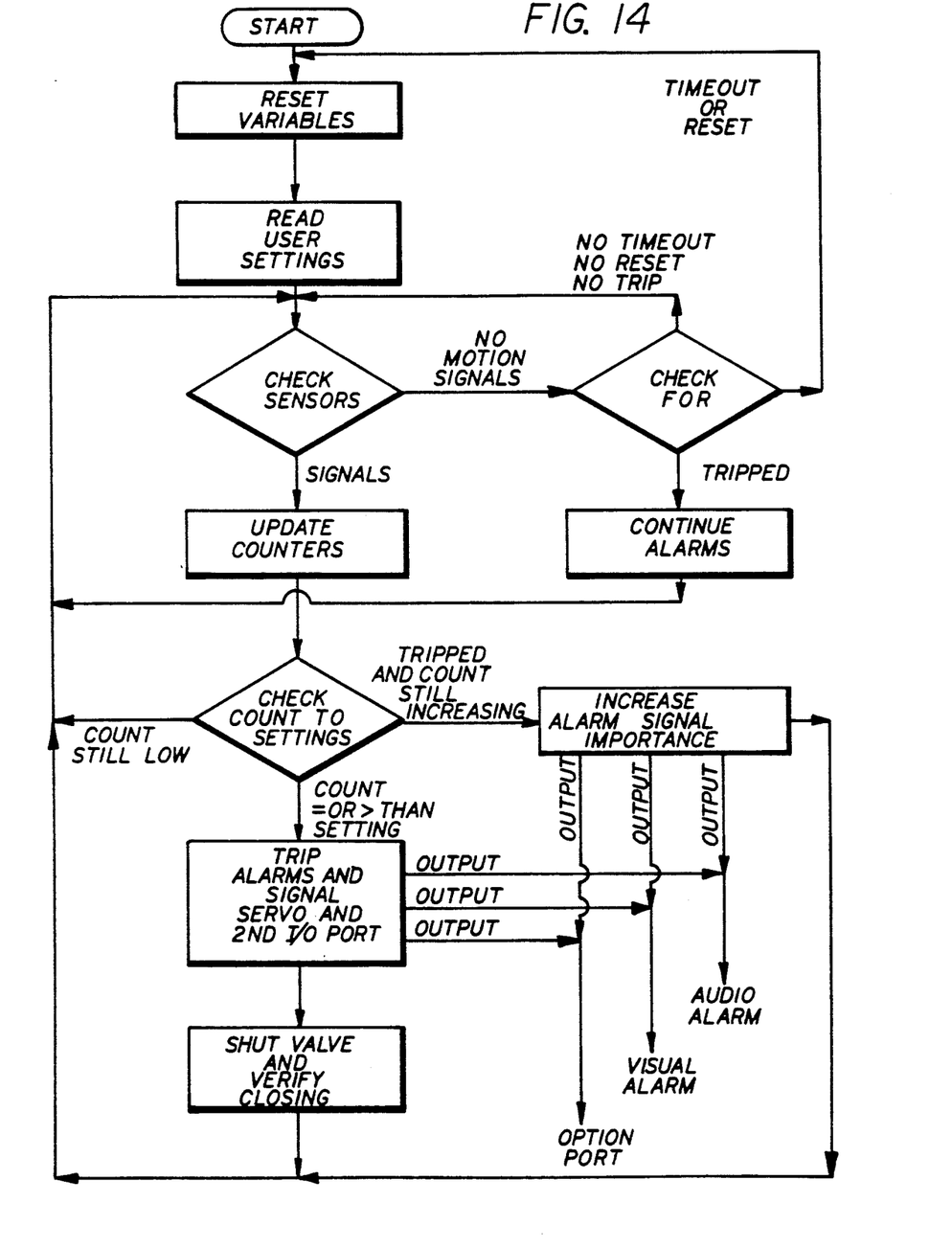
FIG. 14 is a simplified flow chart of one possible programming configuration for the basic operation of the fluid control device of the present invention.

FIG. 14 illustrates a logic flow diagram which is but one possible method for programming the fluid control system 21 to perform a variety of tasks. From the start block, the microprocessor 37 logic arrives at a "RESET VARIABLES" block where it resets the variables, then arrives at a "READ USER SETTINGS" block where it reads the user settings. The logic then proceeds to the "CHECK SENSORS" decision diamond. If there are no new motion signals, the logic arrives at the "CHECK FOR" decision diamond where the existence of the states "timeout", "reset" and "tripped" are checked. If None of the states are found, the logic flows back to the "CHECK SENSORS" decision diamond. If the "timeout" or "reset" states exist, the logic flows back to the "RESET VARIABLES" block. If the "tripped" state exists, the logic continues to the "CONTINUE ALARMS" block and then returns to the "CHECK SENSORS" decision diamond.

At the "CHECK SENSORS" decision diamond, in the event that new signals are received from the sensors, the logic flows to an "UPDATE COUNTERS" command block and then to a "CHECK COUNT TO SETTINGS" decision diamond. If the count is still low, the logic flows back to the "CHECK SENSORS" decision diamond. If the "tripped" state still exists and the count is still increasing, the logic flow proceeds to the "INCREASE ALARM SIGNAL IMPORTANCE" command block, which has outputs to the audio, visual, and option port signal lines, and then back to the "CHECK SENSORS" decision diamond.

In the event that the "CHECK COUNT TO SETTINGS" decision diamond finds that the count is equal or greater than the setting, the logic flow proceeds to the "TRIP ALARMS AND SIGNAL SERVO AND 2ND I/O PORT" command block, which also has outputs to the audio, visual, and option port signal lines, and the logic continues on to the "SHUT VALVE AND VERIFY CLOSING" command block. From the "SHUT VALVE AND VERIFY CLOSING" command block, the logic flow proceeds back to the "CHECK SENSORS" decision diamond, where the logic then continuously re-loops through the range of decision blocks addressable from the "CHECK SENSORS" decision diamond.

Figure 15:
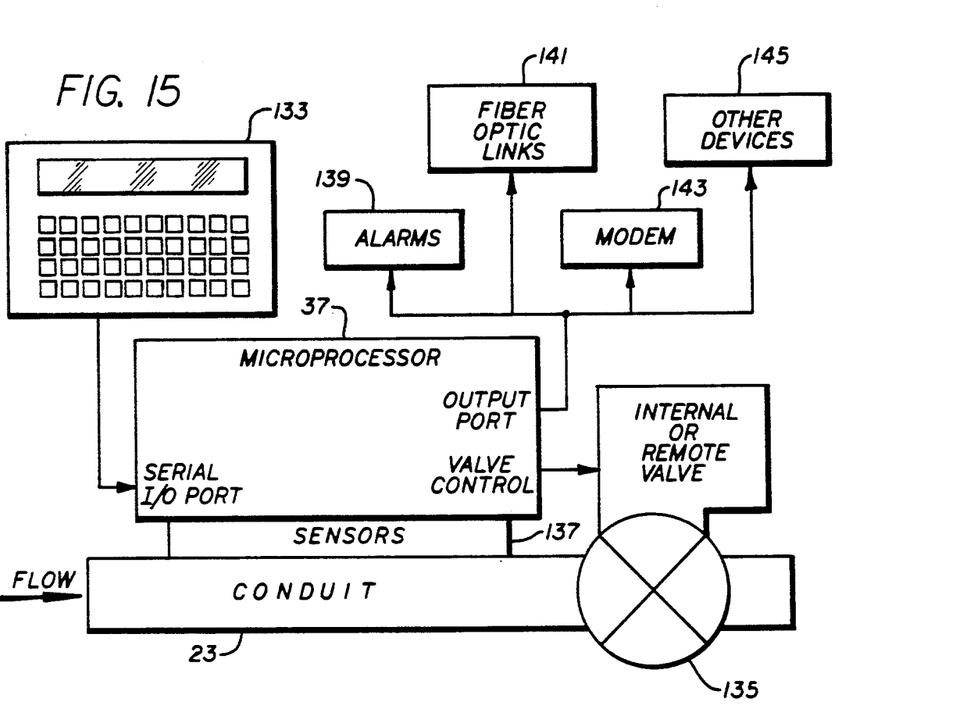
FIG. 15 is a block diagram illustrating the data flow connections between the control module and the input/output devices for the fluid control device of the present invention; and, FIG. 16 is a block and circuit diagram illustrating some of the circuitry detail implementable in conjunction with the fluid control system of the present invention.

Referring to FIG. 15, a block diagram of one of several possible system configurations utilizable with the fluid control system of the present invention illustrates the use of a lap top computer 133 connected into microprocessor 37. The lap top computer 133 is utilized for portability, but a mainframe or desktop computer could just as easily be used with the appropriate data transfer devices, such as a telephone modem or packet modem. Microprocessor 37 is in communication with a valve 135 which may be internal with respect to any housing supporting microprocessor 37, such as a control valve 29, or it may be remotely located.

Microprocessor 37 is in communication with and senses flow in flow conduit 23 via a block of sensors 137. Microprocessor 37 is also enabled to activate alarms 139, fiber optic links 141, modem 143, or other devices 145. In addition, the microprocessor 37 can serve several conduits and control several valves 135. Other multiples of control connections are permissible to form a large number of interconnected control configurations.

Although FIG. 15 illustrates an embodiment which senses flow in a flow conduit, the invention is not intended to be so limited. Sensors which sense different physical parameters may be used; moreover, each sensor may sense a different physical parameter. For example, one sensor may sense flow in a conduit, while another senses pressure, while another senses temperature. Furthermore, the sensors may be remote to the microprocessor 37. For example, in addition to the parameters sensed in the previous example, another sensor may sense, say, the fluid level of a remote reservoir the conduit is feeding. The microprocessor can be programmed to close the valve when the level reaches a programmed maximum. The invention is intended to cover sensing of any parameter, including those remote from the microprocessor.

Figure 16:
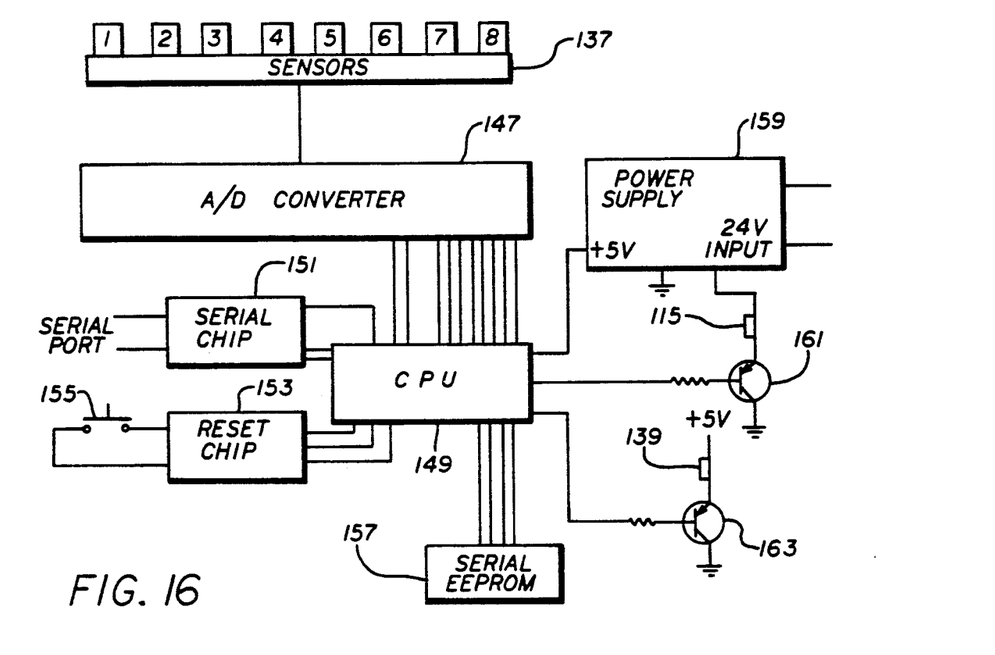

FIG. 16 illustrates the details for one embodiment of the invention. A series of eight sensors 137, each for sensing a particular parameter are connected into an analog to digital converter 147. Analog to digital converter 147 may be used to convert the signals from the sensors 137 to digital format and makes the digital format available to a central processing unit 149. Central processing unit 149, also known as a CPU, may be a microprocessor such as microprocessor 37, or any other computational entity capable of stepwise mathematical or logical operation.

A serial to parallel, or serial chip 151 is connected to CPU 149 for receiving data or instructions from outside the CPU 149, either locally or telemetered remotely from another location, through a serial port as shown. A reset chip 153 operated by a reset button 155 is enabled to reset or interrupt either the operation of CPU 149 to control fluid flow or to receive data. An EEPROM chip 157 can memorize setpoints or commands, or other quantities, even if the CPU 149 loses power, and thus provides a non-volatile memory capability.

A power supply 159, here illustrated as having a twenty-four volt input, supplies a 5 volt input to CPU 149. The twenty-four volt input to power supply 159 can be supplied via batteries 121 or through a transformer (not shown) accompanied by the necessary rectification and filtering circuitry. A voltage output, of appropriate magnitude, is made available through the solenoid coil 115 and then to the emitter of a PNP bipolar junction transistor 161. The base of PNP transistor 161 is connected to CPU 149 while the collector is grounded. CPU 149 can trip transistor 161 to cause current to flow through the emitter of transistor 161 and solenoid coil 115 to trip control valve 29 of FIGS. 4a and 5. Likewise, power supply 159 can also power an alarm 139 through a PNP bipolar junction transistor 63. The base of PNP transistor 163 is connected to CPU 149 while the collector is grounded. Again, CPU 149 can trip transistor 163 to cause current to flow through the emitter of transistor 163 to energize alarm 139.

The operation of the fluid control system 21 is relatively simple. In its unenergized state, solenoid plunger 113 is extended and snaps into locking position of anchoring disk 81 when the valve handle 85 is turned and the poppet valve assembly 87 is opened. Bump stop 111 prevents the anchoring disk 81 and shaft 75 from being moved beyond the open position. Solenoid plunger 113 prevents torque spring 79 from rotating anchoring disk 81 and shaft 75.

When microprocessor 37 has made a logical decision to shut the control valve 29, it sends a signal causing current to flow through solenoid coil 115. The decision may be made on the basis of many flow sensing options, and three are specifically mentioned. The operation of a first flow sensing option is explained with reference to FIGS. 4a–7. When flow through flow conduit 23 begins, the displacement piston 41 is moved in the direction of flow relative to the rate of flow. Positive pressure from resistance spring 47 provides displacement piston 41 with resistance to the fluid flow. The location of apertures 45 with respect to displacement piston 41, when displacement piston 41 is moved through flow cylinder 43, provides for magnified piston travel resulting from trickle flow so that Hall effect sensor 67 will be able to detect trickle flow. This magnified flow also results in sufficient signal levels for representing drip leakage or trickle flow. The spring 47 force is sufficient to provide positive closure about land 57 under no-flow condition so that drop or trickle flow will have to move piston 41 a definite distance beyond Hall effect sensor 67 before flow will take place. A change in voltage signal is generated by Hall effect sensor 67, due to the influence from the magnetic field of displacement piston 41 indicates fluid flow. As displacement piston 41 moves through Hall effect sensor 67, the magnetic field in the Hall effect sensors 67 will cause the moving conductors to become crowded, thus developing a measurable change in an electric field. This field is monitored by microprocessor 37 which calculates fluid volume and rate based on this electric field, or voltage change.

In the second flow option corresponding to the second embodiment of FIGS. 8a and 8b, other mechanical or magnetic means such as reed switches operate as follows. The reed switches 103, mounted adjacent to displacement piston 41 providing voltage current or resistance changes, depending upon the circuit particulars, in relation to the movement of displacement piston 41. This voltage/resistance change is monitored by microprocessor 37 which calculates fluid volume and rate based on the voltage/resistance change.

For a third flow option corresponding to the third embodiment of FIG. 9a and 9b, means such as the tuning coil 105 operates as follows. The tuning coil 105 is mounted so as to surround flow conduit housing 40 and thereby surround displacement piston 41. Displacement piston 41 serves as a core in tuning coil 105. As displacement piston 41 moves out of tuning coil 105, the tuning coil's inductance changes. This inductance change is monitored by microprocessor 37 which calculates fluid volume and rate based on the inductance change. For example, tuning coil 105 can be part of an inductively tuned oscillator. The oscillator output frequency would change in relation to the movement of displacement piston 41.

Irrespective of the flow detection option utilized, when signaled by microprocessor 37, solenoid coil 115 retracts solenoid plunger 113 thereby releasing anchoring disk 81 and allowing shaft 75 and anchoring disk 81 to be rotated 90 degrees, stopping against bump stop 111. Therefore, the energy utilized in closing control valve 29 is the energy stored in torque spring 79. The utilization of the energy of torque spring 79 is for the purpose of minimizing the drain upon batteries 121. It is understood, however, that other means for actuating control valve 29 may be employed, as for example a servo motor and worm gear assembly engaging anchoring disk in absence of torque spring 79. In such a configuration, the valve could be automatically actuated between the open and closed positions, without the need for the "single action" operation where manual cocking is necessary before control valve 29 actuation can occur thereby allowing valve spring 91 and upstream fluid pressure in flow conduit 23 to push poppet valve assembly 87 into valve seat 89, stopping fluid flow through flow conduit 23.

The foregoing disclosure and description of the invention are illustrative and explanatory thereof, and various changes in the values, tolerances, power source, method of measuring the position of the displacement piston, logic flow diagram and system configuration, as in the details of the illustrated construction may be made without departing from the spirit and scope of the invention.

We claim:

1. A fluid control system comprising:
   valve means for movement between the open and closed positions;
   valve actuation means, connected to said valve means, for manual actuation to a first open or closed position, and triggerable actuation to a second closed or open position, respectively;
   a flow rate sensor in series with said valve means for producing an output indicative of flow rate through the valve, all fluid flowing through the valve means flowing through the flow rate sensor, the flow rate sensor comprising a housing having an inlet and an outlet communicating with a central chamber in the housing, a flow cylinder located in the central chamber and forming a flow plenum between the central chamber walls and the flow cylinder, the flow plenum in communicating with the housing outlet, the flow cylinder having a central bore connecting a cylinder inlet with the cylinder outlet, the housing inlet connected to the cylinder inlet, the flow cylinder having a plurality of apertures in its cylindrical wall communicating with the central bore and the flow plenum, a displacement piston positioned within the central bore of the flow cylinder for longitudinal displacement within the central bore, a means for biasing the displacement piston to the cylinder inlet, the piston sealing off the apertures in the cylindrical wall when displaced to the cylinder inlet, the apertures being open when the piston is displaced towards the cylinder outlet, a fluid flowing into the housing inlet flows through the cylinder inlet into the central bore where it displaces the piston towards the cylinder outlet to open the apertures to permit the fluid to flow through the apertures into the flow plenum and out to the housing outlet, the displacement of the piston against the biasing means being proportional to the fluid flow through the flow rate sensor, a means for generating a magnetic field in the piston, and a sensor means responsive to the magnetic field adjacent said housing and proximate said piston for sensing the displacement of the piston and producing an output signal indicative of the fluid flow through the flow rate sensor; and
   microprocessor means, connected to said flow rate sensor and said valve actuation means, said microprocessor means adapted for receiving programmed information and for receiving said output signal and computing a flow volume through the valve means, comparing the flow volume to said programmed information and triggering said valve actuation means when the conditions imposed by said programmed information are met.

2. The fluid control system as recited in claim 1 including manually adjustable control means connected to said microprocessor means for inputting programmed information into the microprocessor means.

3. The fluid control system as recited in claim 1 wherein the microprocessor means is adapted to receive information signals and programmed information from a remote device.

4. The fluid control system as recited in claim 3 wherein the microprocessor means generates an actuation signal when the conditions imposed by the programmed information are met.

5. The fluid control system as recited in claim 4 wherein said actuation signal is communicated to a remote valve actuation means.

6. The fluid control system as recited in claim 5 wherein the microprocessor means generates an actuation signal when the conditions imposed by said programmed information are met which is adapted to be communicated to remote devices which are triggered by said actuation signal.

7. The fluid control system as recited in claim 1 further comprising means for sensing fluid pressure connected to said microprocessor means, for sensing the pressure of a fluid and transmitting sensed pressure information to said microprocessor means, and wherein said microprocessor means further compares the pressure information to said programmed information.

8. The fluid control system as recited in claim 1 further comprising fluid temperature sensing means, connected to said microprocessor means, for sensing the temperature of a fluid and transmitting temperature information to said microprocessor means, and wherein said microprocessor means further compares the temperature information to said programmed information.

9. The fluid control system as recited in claim 1 further comprising ambient temperature sensing means, connected to said microprocessor means, for sensing the temperature of the atmosphere surrounding said fluid control device and transmitting atmospheric temperature information to said microprocessor means, and wherein said microprocessor means further compares the atmospheric temperature information to said programmed information.

10. The fluid control system as recited in claim 1 wherein said valve means is upstream of said flow rate sensing means.

11. The fluid control system as recited in claim 1 wherein said valve means is downstream of said flow rate sensing means.

12. The fluid control system as recited in claim 1 further comprising:
   pressure sensing means, connected to said microprocessor means, for sensing the pressure of a fluid and transmitting data concerning said pressure of said fluid to said microprocessor means;
   fluid temperature sensing means, connected to said microprocessor means, for sensing the temperature of said fluid and transmitting data concerning said temperature of said fluid to said microprocessor means; and
   ambient temperature sensing means, connected to said microprocess or means, for sensing the temperature of the atmosphere surrounding said fluid control device and transmitting data concerning said ambient temperature surrounding said fluid control device to said microprocessor means; and, wherein said microprocessor means is programmed to actuate said valve actuation means in response to any combination, both singly and multiply, of data from said fluid temperature sensing means, ambient temperature sensing means, pressure sensing means and said flow rate sensor.

13. A fluid control system comprising:

valve means for movement between the open and closed positions;

valve actuation means, connected to said valve means, for manual actuation to a first open or closed position, and triggerable actuation to a second closed or open position, respectively;

a flow rate sensor in series with said valve means for producing an output indicative of flow rate through the valve, all fluid flowing through the valve means flowing through the flow rate sensor, the flow rate sensor comprising a housing having an inlet and an outlet communicating with a central chamber in the housing. A flow cylinder located in the central chamber and forming a flow plenum between the central chamber walls and the flow cylinder, the flow plenum in communication with the housing outlet, the flow cylinder having a central bore connecting a cylinder inlet with the cylinder outlet, the housing inlet connected to the cylinder inlet, the flow cylinder having a plurality of apertures in its cylindrical wall communicating with the central bore and the flow plenum, a displacement piston positioned within the central bore of the flow cylinder for longitudinal displacement within the central bore, a means for biasing the displacement piston to the cylinder inlet, the piston sealing off the apertures in the cylindrical wall when displaced to the cylinder inlet, the apertures being open when the piston is displaced towards the cylinder outlet, a fluid flowing into the housing inlet flows through the cylinder inlet into the central bore where it displaces the piston towards the cylinder outlet to open the apertures to permit the fluid to flow through the apertures into the flow plenum and out to the housing outlet, the displacement of the piston against the biasing means being proportional to the fluid flow through the flow rate sensor, a means for generating a magnetic field in the piston, and a sensor means responsive to the magnetic field adjacent said housing and proximate said piston for sensing the displacement of the piston and producing an output signal indicative of the fluid flow through the flow rate sensor;

microprocessor means, connected to said flow rate sensor and valve actuation means, said microprocessor means adapted for receiving programmed information and adapted for receiving transmitted physical condition parameter information and comparing the transmitted physical condition parameter to said programmed information, and triggering said valve actuation means when the conditions imposed by said programmed information are met; and sensing means, connected to said microprocessor means for sensing a physical condition parameter and transmitting physical condition parameter information to said microprocessor means.

14. The fluid control system as recited in claim 13 including manually adjustable control means connected to said microprocessor means, for inputting programmed information into a microprocessor means.

15. The fluid control system as recited in claim 13 wherein said sensing means further comprises fluid pressure sensing means, connected to said microprocessor means, for sensing the pressure of fluid in communication with said valve means and transmitting pressure information to said microprocessor means, and wherein said microprocessor means further compares the pressure information to said programmed information.

16. The fluid control system as recited in claim 13 wherein said sensing means further comprises ambient atmospheric temperature sensing means, connected to said microprocessor means, for sensing the temperature of the ambient atmosphere and transmitting temperature information to said microprocessor means, and wherein said microprocessor means further compares the temperature information to said programmed information.

17. The fluid control system as recited in claim 13 wherein said sensing means further comprises fluid temperature sensing means, connected to said microprocessor means, for sensing the temperature of fluid in communication with said valve means, and transmitting said temperature information to said microprocessor means, and wherein said microprocessor means further compares the fluid temperature information to said programmed information.

18. The fluid control system as recited in claim 13 wherein said sensing means further comprises:

fluid temperature sensing means, connected to said microprocessor means, for sensing the temperature of fluid in communication with said valve means, and for transmitting fluid temperature information to said microprocessor means;

pressure sensing means, connected to said microprocessor means, for sensing the pressure of said fluid in communication with said valve means, and transmitting pressure information to said microprocessor means;

ambient temperature sensing means, connected to said microprocessor means, for sensing the temperature of the ambient atmosphere surrounding said fluid control device and transmitting said ambient atmosphere temperature information to said microprocessor means; and, wherein said microprocessor means is programed to actuate said valve actuation means in response to any combination, both singly and multiply, of said fluid temperature information, said ambient atmospheric temperature information, said fluid pressure information, and said programmed information.

19. A fluid control system as recited in claim 1 wherein the biasing means comprises a spring connected to the piston for biasing the piston towards the cylinder inlet.

20. A fluid control system as recited in claim 1 wherein the sensor means comprises a plurality of hall effect transducers which respond to the magnetic field emanating from the piston by the magnetic field means.

21. A fluid control system as recited in claim 1 wherein the sensor means comprises a plurality of reed switches which are responsive to the movement of the magnetic field emanating from the piston.

22. A fluid control system as recited in claim 1 wherein the sensor means is a coil winding about the body of the flow rate sensor whose inductance is measurably affected by the movement of the magnetic field emanating from the displacement piston.

23. A fluid control system as recited in claim 1 wherein means for generating a magnetic field is a magnet located within the displacement piston.

24. A fluid control system as recited in claim 1 wherein the means for generating for magnetic field is a ferromagnetic displacement piston.

25. A flow sensor producing an output indicative of the fluid flow rate through the sensor, the flow rate sensor comprising:

a housing having an inlet and outlet communicating with a central chamber in the housing;

a flow cylinder located in the central chamber of the housing and forming a flow plenum between the central chamber walls and the flow cylinder, the flow plenum in communication with the housing outlet, the flow cylinder having a central bore connecting a cylinder inlet and a cylinder outlet, the housing inlet connected to the cylinder inlet, the flow cylinder having a plurality of apertures in its cylindrical wall communicating with the central bore and the flow plenum;

a displacement piston positioned within the central bore of the flow cylinder for longitudinal displacement within the central bore;

a means for biasing the displacement piston to the cylinder outlet, the piston sealing off the apertures in the cylindrical wall when displaced to the cylinder inlet, the apertures being open when the piston is displaced towards the cylinder outlet, a fluid flowing through the housing into the housing inlet, flowing through the cylinder inlet into the central bore where it displaces the piston towards the cylinder outlet opening the apertures and permitting fluid to flow through the apertures into the flow plenum and out of the housing outlet, the displacement of the piston against the biasing means being proportional to the fluid flow rate through the flow rate sensor;

a means for generating a magnetic field from the piston; and a sensor means responsive to the magnetic field adjacent said housing and proximate said piston for sensing the displacement of the piston and producing an output signal indicative of the fluid flow through the flow rate sensor.

26. A flow rate sensor as recited in claim 19 wherein the biasing means comprises a spring connected to the piston for biasing the piston towards the cylinder inlet.

27. A flow rate sensor as recited in claim 20 wherein the sensor means comprises a plurality of hall effect transducers which respond to the magnetic field emanating from the piston by the magnetic field means.

28. A flow rate sensor as recited in claim 21 wherein the sensor means comprises a plurality of reed switches which are responsive to the movement of the magnetic field emanating from the piston.

29. A flow rate sensor as recited in claim 12 wherein the sensor means is a coil winding about the body of the flow rate sensor whose inductance is measurably affected by the movement of the magnetic field emanating from the displacement piston.

30. A flow rate sensor as recited in claim 27 wherein the means for generating a magnetic field is a ferromagnetic displacement piston.

31. A flow rate sensor as recited in claim 24 wherein the means for generating a magnetic field is a ferromagnetic displacement piston.

* * * * *